United States Patent
Kim et al.

(10) Patent No.: US 10,559,063 B2
(45) Date of Patent: Feb. 11, 2020

(54) IMAGE GENERATING APPARATUS AND METHOD FOR GENERATION OF 3D PANORAMA IMAGE

(71) Applicant: SAMSUNG ELECTRONICS CO., LTD., Suwon-si, Gyeonggi-do (KR)

(72) Inventors: Do-wan Kim, Suwon-si (KR); Geng-yu Ma, Suwon-si (KR); Sung-jin Kim, Suwon-si (KR); Jae-yun Jeong, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 179 days.

(21) Appl. No.: 15/514,153

(22) PCT Filed: Sep. 23, 2015

(86) PCT No.: PCT/KR2015/009981
§ 371 (c)(1),
(2) Date: Mar. 24, 2017

(87) PCT Pub. No.: WO2016/048020
PCT Pub. Date: Mar. 31, 2016

(65) Prior Publication Data
US 2017/0293998 A1    Oct. 12, 2017

(30) Foreign Application Priority Data
Sep. 26, 2014   (KR) .................. 10-2014-0129431

(51) Int. Cl.
*H04N 13/04*   (2006.01)
*G06T 3/40*    (2006.01)
(Continued)

(52) U.S. Cl.
CPC .............. *G06T 3/4038* (2013.01); *G06T 5/50* (2013.01); *G06T 7/33* (2017.01); *H04N 5/23238* (2013.01); *H04N 13/261* (2018.05)

(58) Field of Classification Search
CPC ........... G06T 3/4038; G06T 5/50; G06T 7/33; H04N 13/00; H04N 13/111; H04N 13/128;
(Continued)

(56) References Cited

U.S. PATENT DOCUMENTS 6,639,596 B1   10/2003  Shum et al.
6,665,003 B1   12/2003  Peleg et al.
(Continued)

FOREIGN PATENT DOCUMENTS

CN   101577795   11/2009
CN   101771830   7/2010
(Continued)

OTHER PUBLICATIONS

Huang et al. "Stereo Panorama Imaging and Display for 3D VR System" 2008 IEEE, 5 pages.*
(Continued)

*Primary Examiner* — Nathnael Aynalem
(74) *Attorney, Agent, or Firm* — Nixon & Vanderhye, P.C.

(57) ABSTRACT

Disclosed are an apparatus and a method for generating an image for generation of a 3D panorama image. A method for generating a 3D panorama image in an image generating apparatus comprises the steps of: receiving an input of a plurality of 2D images and a plurality of depth maps corresponding to the plurality of 2D images; setting a left-eye image area and a right-eye image area for each of the plurality of 2D images on the basis of the plurality of depth maps; and synthesizing images of each of the left-eye
(Continued)

image areas that are set in the plurality of 2D images to thereby generate a left-eye panorama image and synthesizing images of each of the right-eye image areas that are set in the plurality of 2D images to thereby generate a right-eye panorama image. Accordingly, the image generating apparatus can generate a 3D panorama image without distortion on the basis of a plurality of 2D images.

13 Claims, 7 Drawing Sheets

(51) Int. Cl.
  *G06T 7/33* (2017.01)
  *H04N 13/261* (2018.01)
  *G06T 5/50* (2006.01)
  *H04N 5/232* (2006.01)

(58) Field of Classification Search
  CPC .. H04N 13/221; H04N 13/261; H04N 13/271; H04N 5/23238; H04N 2013/0088; H04N 13/122; H04N 13/264; H04N 13/0022; H04N 13/257; H03J 7/32; G03B 37/04
  USPC .......................................................... 348/36
  See application file for complete search history.

(56) References Cited

U.S. PATENT DOCUMENTS

| | | |
|---|---|---|
| 6,677,982 B1 | 1/2004 | Chen et al. |
| 8,503,765 B2 | 8/2013 | Woo et al. |
| 8,686,993 B2 | 4/2014 | Tokuda |
| 8,687,048 B2 | 4/2014 | Morifuji |
| 9,729,788 B2 | 8/2017 | Furumura et al. |
| 2008/0175481 A1 | 7/2008 | Petrescu et al. |
| 2011/0025828 A1* | 2/2011 | Ishiyama ............ H04N 5/23293 348/47 |
| 2011/0043604 A1 | 2/2011 | Peleg et al. |
| 2011/0141227 A1 | 6/2011 | Bigioi et al. |
| 2011/0175907 A1 | 7/2011 | Tokuda |
| 2012/0268557 A1* | 10/2012 | Kim ................... H04N 13/0022 348/42 |
| 2013/0009955 A1* | 1/2013 | Woo ........................ G06T 5/005 345/419 |
| 2013/0063549 A1* | 3/2013 | Schnyder ............ H04N 13/264 348/36 |
| 2013/0076856 A1* | 3/2013 | Wakabayashi ......... G03B 35/10 348/36 |
| 2013/0162786 A1 | 6/2013 | Kosakai et al. |
| 2013/0250045 A1 | 9/2013 | Ki et al. |
| 2013/0335521 A1 | 12/2013 | Lin |
| 2014/0118482 A1* | 5/2014 | Noh .................... H04N 5/23238 348/36 |
| 2014/0146131 A1* | 5/2014 | Niemi .................... G03B 37/04 348/36 |
| 2014/0267594 A1 | 9/2014 | Furumura et al. |
| 2014/0267618 A1* | 9/2014 | Esteban .................. G06T 5/003 348/46 |

FOREIGN PATENT DOCUMENTS

| | | |
|---|---|---|
| CN | 103109538 | 5/2013 |
| CN | 103168315 | 6/2013 |
| EP | 2 560 398 | 2/2013 |
| EP | 2 779 621 | 9/2014 |
| JP | 2011-135459 | 7/2011 |
| JP | 2011-147067 | 7/2011 |
| JP | 2011-160221 | 8/2011 |
| JP | 2011-259168 | 12/2011 |
| JP | 2013-042414 | 2/2013 |
| JP | 2013-527646 | 6/2013 |
| JP | 2013-541884 | 11/2013 |
| JP | 2014-086948 | 5/2014 |
| KR | 10-2011-0134147 | 12/2011 |
| KR | 10-2012-0072146 | 7/2012 |
| KR | 10-1370718 | 3/2014 |
| WO | 20121032412 | 3/2012 |
| WO | 2013/069050 | 5/2013 |

OTHER PUBLICATIONS

Extended Search Report dated Oct. 12, 2017 in counterpart European Patent Application No. 15844049.5.
International Search Report for PCT/KR2015/009981 dated Jan. 26, 2016, 2 pages.
Written Opinion (w/ Translation) of the ISA for PCT/KR2015/009981 dated Jan. 26, 2016, 10 pages.
CN Office Action for CN201510548675.4 dated Jan. 18, 2017, 8 pages.
English Translation of CN Office Action for CN201510548675.4 dated Jan. 18, 2017, 12 pages.
S. Cho et al., "A Study on 3D Panoramic Generation Using Depth-map", Nov. 30, 2011, pp. 831-838, Abstract attached.
Cho, A Study on 3D Panoramic Generation Using Depth-Map, Dec. 2011, 125 pages.
Office Action dated Oct. 29, 2019 in counterpart Japanese Patent Application No. 2017-514797 and English-language translation.

\* cited by examiner

IMAGE GENERATING APPARATUS AND METHOD FOR GENERATION OF 3D PANORAMA IMAGE

This application is the U.S. national phase of International Application No. PCT/KR2015/009981 filed 23 Sep. 2015 which designated the U.S. and claims priority to KR Patent Application No. 10-2014-0129431 filed 26 Sep. 2014, the entire contents of each of which are hereby incorporated by reference.

TECHNICAL FIELD

The present invention pertains to an image generation apparatus for generating a 3D panoramic image and a method thereof, and more particularly to, an image generation apparatus for generating a 3D panoramic image on the basis of a plurality of 2D images and the depth map respectively corresponding to a plurality of 2D images and a method thereof.

BACKGROUND ART

The development of electronic technology has led to development and distribution of various types of electronic products and supplies. In particular, various kinds of capturing devices such as TV, mobile phone, PC, notebook PC, and PDA are widely used in most homes.

In tandem with increased use of capturing devices, user needs for more diverse functions have improved. Accordingly, the efforts of individual manufacturers to meet user needs grow, producing products with new functions that were not present in the conventional products.

In particular, an electronic device such as a smart phone or tablet PC which have been developed in recent years may generate a 2D panoramic image using a plurality of continuously-captured a 2D images using a built-in camera. Moreover, recently developed electronic devices may generate a 3D panoramic image using a plurality of the 2D images in the continuous capturing. This way, as a method for generating a 3D panoramic image on the basis of the plurality of the 2D images, a following method has been applied.

First, there is a method for generating a 3D panoramic image using a 2D panoramic image and depth panoramic image (hereinafter, the first related art). Specifically, in the first related art, a 2D panoramic image is generated by using a plurality of the 2D images in the continuous capturing, and based on the plurality of the depth map respectively corresponding to a plurality of 2D images, a depth panoramic image is generated. Then, the first related art is to generate a 2D panoramic image to a 3D panoramic image based on the depth panoramic image generated from a plurality of depth maps.

However, when generating a 3D panoramic image through the first related art, there is a problem that a hidden area occurs in a background area. If hole filling is performed for the hidden area, the image defect in the 3D panoramic image will occur accordingly.

Secondly, there is a method of generating a 3D panoramic image by extracting a strip of a camera and generating two series of strips, and mosaicking or stitching them (hereinafter, the second related art).

However, in order to generate a stable strip from a 2D image through the second related art, there is a problem that a separate rotary device should be used. That is, in order to create a stable strip from a 2D image, a capturing direction of a 2D image or a moving direction should be in a vertical direction. However, the capturing direction and the moving direction of the capturing device are not regular and thus, defect or distortion occurs in the continuously-captured 2D image. Therefore, when generating a 3D panoramic image using the distorted 2D image, there would be problems of stair-shaped image defect on the generated 3D image, structural distortion, and drift phenomenon where an area of panoramic image generation is reduced.

DETAILED DESCRIPTION

Tasks to Be Solved

The present invention has been designed according to the above need, and the object of the present invention is to generate a 3D panoramic image without distortion from a plurality of 2D images.

Furthermore, it is an object of the present invention to generate a 3D panoramic image without distortion using a hand-held camera, not using a separate apparatus.

Means for Solving Problems

According to an exemplary embodiment, a method for generating a 3D panoramic image by an image generating apparatus includes receiving a plurality of 2D images and a plurality of depth maps corresponding to the plurality of 2D images; based on the plurality of depth maps, setting a left-eye image area and a right-eye image area for each of the plurality of 2D images; and generating a left-eye panoramic image by composing an image of each of a left-eye image area set within the plurality of 2D images, and generating a right-eye panoramic image by composing an image of each of a right-eye image area set within the plurality of 2D images.

At least one 2D image from among the plurality of 2D images may be overlapped with a portion of a 2D image.

The setting may include analyzing depth values of each of a plurality of depth maps and setting, from among an area having a similar depth value and an image area of 2D, an image area belonging to a preset first area as a left-eye image area and setting an image area belonging to a preset second area as a right-eye image area.

The setting may include setting an image area by the plurality of 2D images using segmentation algorithm, setting an image area belonging to a preset first area as a left-eye image area and an image area belonging to a preset second area as a right-eye image area from among the set image area.

The method may further include extracting feature points from a plurality of 2D images, wherein the generating may include generating a left-eye panoramic image on a plurality of left-eye image area based on feature points of images of a plurality of left-eye image area, and generating a right-eye panoramic image on a plurality of right-eye image area based on feature points of images of a plurality of right-eye image area.

The method may further include estimating a capturing direction and position of the capturing device which captures a plurality of 2D images; and in consideration of the estimation result, correcting a plurality of 2D images and a plurality of depth maps to a reference image and a reference depth map obtainable when capturing a depth map from a reference direction and reference position by the capturing device, wherein the setting may include setting a left-eye image area and a right-eye image area with respect to each of the plurality of corrected 2D images based on the corrected reference depth map.

The estimating may include estimating a capturing direction and position of the capturing device based on at least one of change information of the feature points extracted from a plurality of 2D images and a result estimated through a sensor, wherein the sensor may be an inertial measurement unit (IMU).

The method may further include, in response to depth map corresponding to a plurality of 2D images not being input, generating depth map corresponding to a plurality of 2D images through stereo matching between 2D images corresponding to a direction and a position of the capturing device which is estimated based on a result estimated through the sensor.

The generating may include composing an image of a plurality of left-eye image area using image mosaicking algorithm, and composing an image of a plurality of a left-eye image area.

According to an exemplary embodiment, an image generating device includes an image inputter configured to receive a plurality of 2D images and a plurality of depth maps corresponding to the plurality of 2D images; an area setting unit configured to set a left-eye image area and a right-eye image area for each of the plurality of 2D images based on the plurality of depth maps; and a controller configured to generate a left-eye panoramic image by composing an image of each of a left-eye image area set within the plurality of 2D images, and generate a right-eye panoramic image by composing an image of each of a right-eye image area set within the plurality of 2D images.

At least one 2D image from among the plurality of 2D images may be overlapped with a portion of a 2D image.

The area setting unit may analyze depth values of each of a plurality of depth maps and sets, from among an area having a similar depth value and an image area of 2D, an image area belonging to a preset first area as a left-eye image area and set an image area belonging to a preset second area as a right-eye image area.

The area setting unit may set an image area by the plurality of 2D images using segmentation algorithm and set an image area belonging to a preset first area as a left-eye image area and an image area belonging to a preset second area as a right-eye image area from among the set image area.

The controller may extract feature points from a plurality of 2D images, generate a left-eye panoramic image on a plurality of left-eye image area based on feature points of images of a plurality of left-eye image area, and generate a right-eye panoramic image on a plurality of right-eye image area based on feature points of images of a plurality of right-eye image area.

The device may further include a position estimation unit configured to estimate a capturing direction and position of the capturing device which captures a plurality of 2D images; and an image conversion unit configured to, in consideration of the estimation result, correct a plurality of 2D images and a plurality of depth maps to a reference image and a reference depth map obtainable when capturing a depth map from a reference direction and reference position by the capturing device, wherein the area setting unit may set a left-eye image area and a right-eye image area with respect to each of the plurality of corrected 2D images based on the corrected reference depth map.

In addition, the position estimation unit, based on change information of the feature points extracted from a plurality of 2D images and a result estimated through a sensor, may estimate a direction and a position of the capturing device, and the sensor may be an inertial measurement unit (IMU).

The controller, in response to depth map corresponding to a plurality of 2D images not being input, may generate depth map corresponding to a plurality of 2D images through stereo matching among 2D images corresponding to a direction and position of the capturing device based on a result estimated through the position estimation unit.

In addition, the controller, by using image mosaicking algorithm, may compose an image of a plurality of left-eye image areas and compose an image of a plurality of right-eye image areas.

Effect of Invention

According to various embodiments of the invention, the image generation apparatus may generate a 3D panoramic image without distortion based on the plurality of 2D images.

BEST MODE

Figure 1:
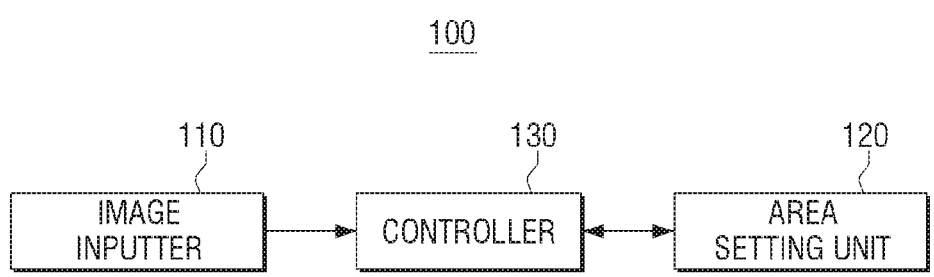
FIG. 1 is a block diagram of an image generation apparatus for generating a plurality of 2D image to a 3D panoramic image according to an exemplary embodiment.

FIG. 1 is a block diagram of an image generation apparatus for generating a plurality of 2D image to a 3D panoramic image according to an exemplary embodiment.

As illustrated in FIG. 1, the image generation apparatus 100 may be a camera that can shoot images in a 2D panorama. The image generation apparatus 100 includes an image inputter 110, an area setting unit 120, and a controller 130.

The image inputter 110 receives a plurality of 2D images and the depth map which corresponds to each of a plurality of 2D images. Here, each of the plurality of the 2D images is preferably overlapped with a part of the front and rear 2D image. The plurality of 2D images are captured by a capturing apparatus 10 which will be described later, and a plurality of depth maps respectively corresponding to each of the plurality of the 2D images can be either generated in the image generation apparatus 100, or received from an external device (not shown). However, the present invention is not limited thereto, and a plurality of 2D images and the depth map corresponding to the plurality of the 2D images may be received from an external device (not shown). Here, an external device (not shown) generating a depth map corresponding to each of a plurality of 2D images may be a depth image capturing apparatus. The depth image capturing apparatus may generate a depth map corresponding to each of the plurality of the 2D images through at least one of a pattern projection, stereo camera, and the Time of Flight.

The area setting unit 120 sets the left-eye image area and the right-eye image area for each of a plurality of 2D images, based on a plurality of the depth map.

According to one embodiment, the area setting unit 120 may analyze depth values of each of a plurality of depth map and from among areas having similar depth values and a 2D image projection area corresponding thereto, may set an image area belonging to a preset first area as a left-eye image area and an image area belonging to a preset second area as a right-eye image area.

According to another embodiment, the area setting unit 120 may set areas by a plurality of 2D images using color segmentation algorithm and set the image area belonging to the first area as a left-eye image, and the area belonging to the second area as a right-eye image.

The controller 130 controls the overall operation of each configuration of the image generation apparatus 100. In particular, the controller 130 synthesizes the respective images in the left eye image region set in the plurality of the 2D images to generate the left-eye panorama image. In addition, the controller 130 synthesizes the respective images in the right eye image region set in the plurality of the 2D images and generates a right-eye panorama image Specifically, the controller 130 extracts the feature points from a plurality of 2D images, respectively. Here, because the technology for extracting feature points from the 2D images is a well-known technique so it will not be further described. When the feature points are extracted from the plurality of the 2D images, respectively, the controller 130, based on the feature points of images of a plurality of left-eye image area, generates a left-eye panorama image. And, the controller 130, based on the feature points of images of a plurality of right-eye image area, generates a right-eye panorama image.

According to the embodiment, the controller 130 may compose a plurality of left-eye images to generate a left-eye panoramic image using image mosaicking algorithm, and generate a right-eye panoramic image by synthesizing a plurality of right-eye images. The technology of synthesizing images is well-known art and will not be further described.

Figure 2:
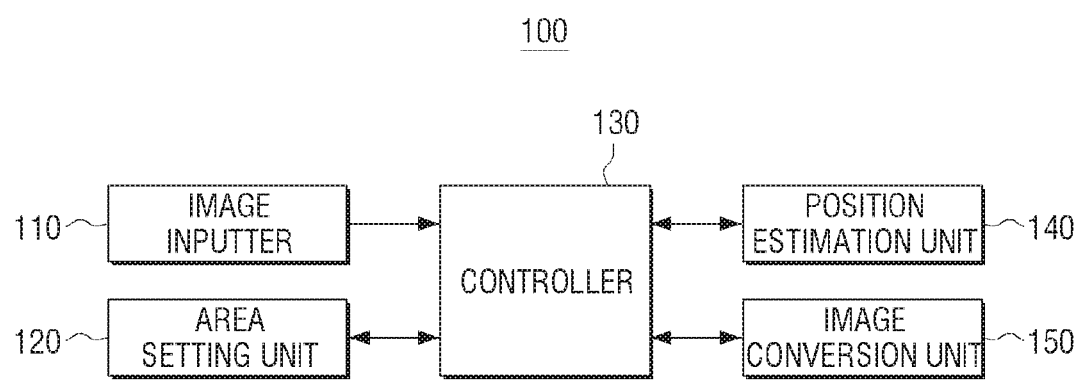
FIG. 2 is a detailed block diagram of an image generation apparatus according to an exemplary embodiment.

FIG. 2 is a detailed block diagram of an image generation apparatus according to an exemplary embodiment.

As illustrated in FIG. 2, the image generation apparatus 100 may further include a position estimator 140 and an image converting unit 150, in addition to the above-described image inputter 110, an area setting unit 120 and controller 130.

The position estimator 140 estimates a capturing direction and position of the capturing device 10 which captures a plurality of 2D images, and the image conversion unit 150, in consideration of estimated result from the position estimator 140, adjusts a plurality of 2D images and depth maps to reference images and reference depth map obtainable when the capturing device 10 captures the image in a reference direction and position. Therefore, the area setting unit 120, based on the reference depth map adjusted through the image conversion unit 150, may set a left-eye image and a right-eye image for each of a plurality of 2D images.

On the other hand, the position estimator 140 estimating the direction and the position of the capturing device 10 can estimate the position and direction of the capturing device 10, based on at least one of information of changes in the feature points extracted from the plurality of 2D images and results estimated through a sensor. Here, the sensor is an inertial measurement unit (IMU) which provides acceleration, speed, direction, distance of the capturing device 10 by measuring inertia of movement, and can be one of an accelerometer, gyroscope and a geomagnetic sensor.

The controller 130, when depth map corresponding to a plurality of 2D images are not input, may generate depth map corresponding to a plurality of 2D images through stereo matching among 2D images corresponding to direction and position of the capturing device 10 based on the results estimated through the position estimator 140.

In the following, an operation for generating a 3D panorama image from a plurality of 2D images will be further described through the image generation apparatus 100.

Figure 3:
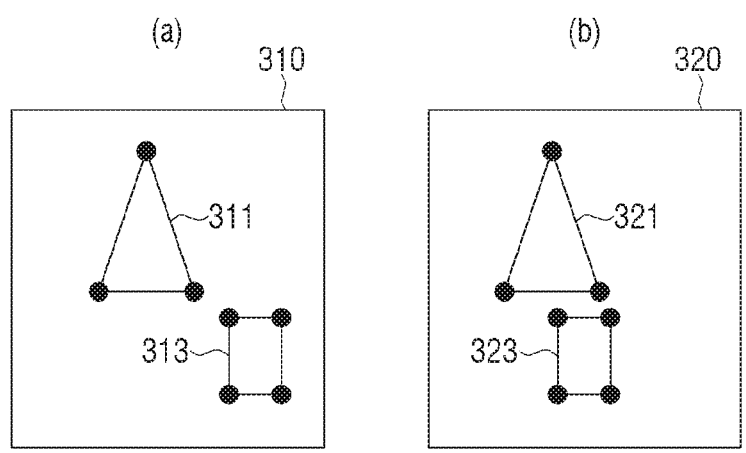
FIG. 3 is an exemplary view generating a depth map corresponding to a plurality of 2D images based on a plurality of 2D images in the image generation apparatus according to an exemplary embodiment.
Figure 3:

FIG. 3 is an exemplary view generating a depth map corresponding to a plurality of 2D images based on a plurality of 2D images in the image generation apparatus according to an exemplary embodiment.

The capturing device 10 may capture the subject in a left direction of the subject while moving from the left to the right direction. When the capturing device 10 is shooting a subject in the left direction, as shown in FIG. 3(a), the first 2D image 310 for the captured subject in the left direction can be generated. Then, when the capturing device 10 captures a subject in the right direction, as illustrated in FIG. 3(b), the second 2D image 320 on the subject taken from the right side can be generated as shown in (b) of FIG. 3(b).

This way, the first and second 2D images 310 and 320 are generated, the controller 130 compares the feature points of the 1-1 and 1-2 objects 311 and 313 included in the first 2D image 310 and the feature points of the 2-1 and 2-2 objects 321, 323 included in the second 2D image 320. That is, the controller 130 compares the pixel values corresponding to the feature points of the 1-1 object 311 included in the first 2D image and the pixel value corresponding to the feature points of the 2-1 object 321 included in the second 2D image 320. In addition, the controller 130 compares the pixel values corresponding to the feature points of the 1-2 object 313 included in the first 2D image 310 and the pixel value corresponding to the feature points of the 2-2 object 323 included in the second 2D image 320.

As the comparison result, when the difference of pixel values between the 1-2 object 313 and the 2-2 object 323 is greater than a preset threshold value and the difference of pixel values between the 1-1 object 311 and the 2-1 object 321 is less than a preset threshold value, the controller 130 determines that the 1-2 object 313 and the 2-2 object 323 is located adjacent to the capturing device 10. That is, the position of the object located near the capturing device 10 can be relatively larger than the position located distant from the capturing device 10.

Therefore, the controller 130 may set the depth value of the 1-2 object 313 included in the first 2D image and the depth value of the 2-2 object 323 included in the second 2D image 320 higher than the depth value of the 1-1 object 311 included in the first 2D image 310 and the depth value of the 2-1 object 321 included in the second 2D image 320, and generate depth maps corresponding to each of the first and second images 310 and 320.

In addition, the controller 130 may estimate a capturing direction and position of the capturing device 10 based on the feature point of 1-1 and 1-2 objects 311, 313 included in the first 2D image 310 and the feature points of the 2-1 and 2-2 objects 321, 323 included in the second 2D image 320.

As described above, the image generation device 100 according to the present invention may determine 2D images other than the 2D image captured in a reverse direction from among a plurality of 2D images photographed by the capturing device 10 through the direction and position at the time when a plurality of 2D images are captured as an image for generating a 3D panoramic image.

As such, when the capturing direction and position of the capturing device 10 which captures the first and second 2D images 310, 320 are estimated through the first and second 2D images 310, 320, the image conversion unit 150 may estimate the photographing direction and position of the capturing device 10 at the point of time of capturing a 2D image, and through the direction and position of the capturing device 10, moving trace of the capturing device 10 can be determined. That is, the image conversion unit 150 may determine a coordinate value according to the moving trace of the capturing device 10 in the 3D, and change the former moving trace to a moving trace which can minimize error rate based on the determined coordinate value. Here, the changed moving trace can be a point that 2D image capturing is possible from the reference direction and position of the capturing device 10. Therefore, the former moving trace is changed, the image conversion unit 150 may correct a 2D image to a reference 2D image according to a change degree of the coordinate value on the former moving trace and a change decree of the coordinate value on the changed moving trace, and correct a depth map respectively corresponding to 2D images before amendment to depth map based on the amended reference 2D image.

This way, when the plurality of the 2D images and depth map corresponding to the plurality of the 2D images are corrected, the area setting unit 120 may set the left-eye and right-eye image area for the corrected 2D image, based on the corrected depth map.

Figure 4:
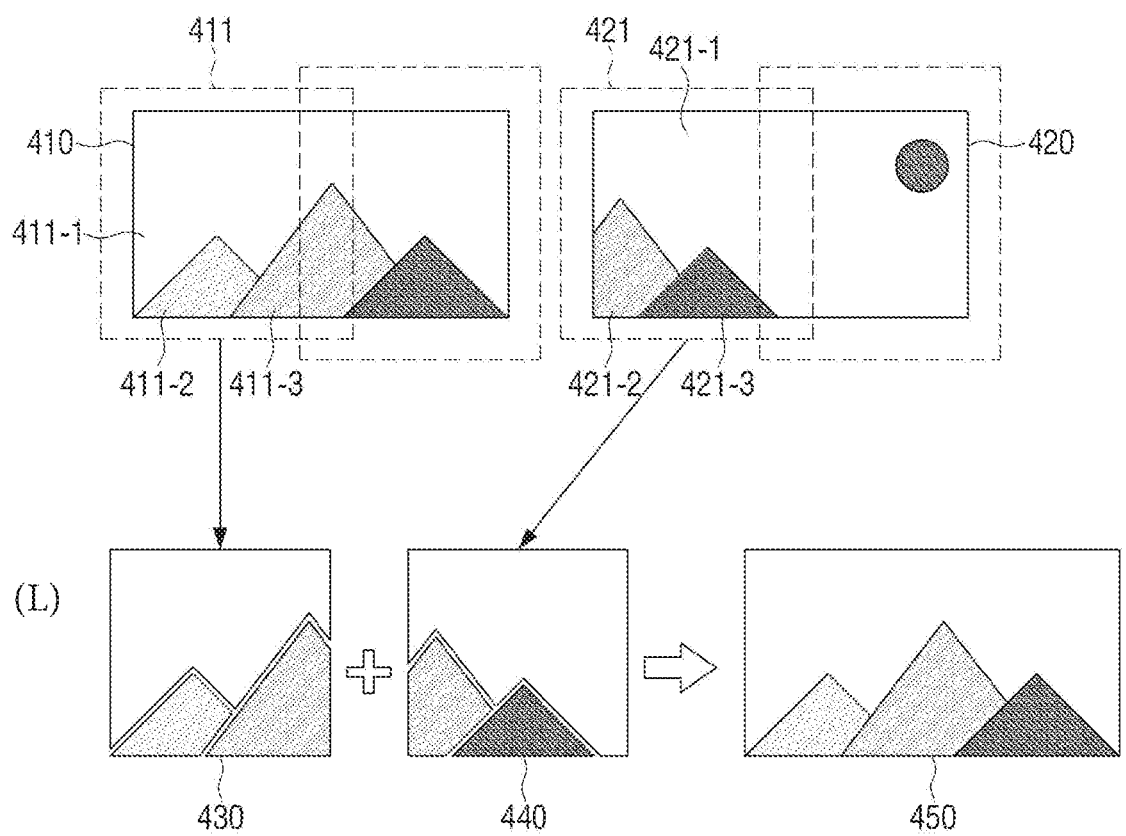
FIG. 4 is an exemplary view to set a left-eye image area based on depth map of a 2D image in the image generation apparatus according to an exemplary embodiment.
Figure 5:
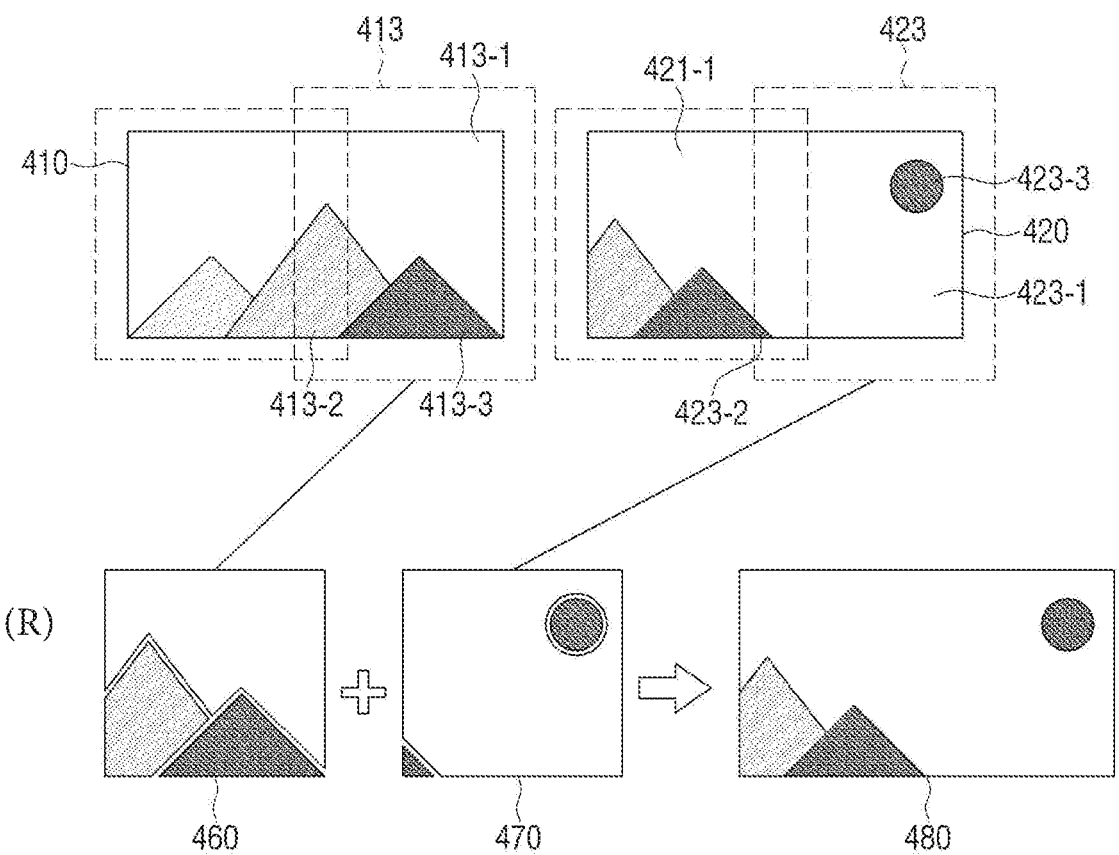
FIG. 5 is an exemplary view to set a right-eye image area based on depth map of a 2D image in the image generation apparatus according to an exemplary embodiment.

FIG. 4 is an exemplary view to set a left-eye image area based on depth map of a 2D image in the image generation apparatus according to an exemplary embodiment, and FIG. 5 is an exemplary view to set a right-eye image area based on depth map of a 2D image in the image generation apparatus according to an exemplary embodiment.

As illustrated in FIG. 4, the area setting unit 120 analyzes a depth value belonging to the first area 411, 421 from among the first and second depth map 410, 420 areas and divides an area having a similar depth value. That is, the area setting unit 120, on the first area 411 of the first depth map 410, may divide areas to area a 411-1, area b 411-2, and area c 411-3 having similar depth maps. Therefore, the area setting unit 120 may set area a 411-1, area b 411-2, and area c 411-3 having similar depth maps as the left-eye image area of the first depth map 410. In addition, the area setting unit 120 may divide the area d 421-1, area e 421-2, and area f 421-3 on the first area 421 to areas having the similar depth values. Therefore, the area setting unit 120 may set area d 421-1, area e 421-2, and area f 421-3 having the similar depth maps to a left-eye image area of the second depth map 420. As such, when a left-eye image is set on the first area 411, 421 of each of the first and second depth maps 410, 420, the controller 130 obtains the first image 430 and the second image 440 corresponding to a left-eye image area from among the first and second 2D images respectively corresponding to the first and second depth maps 410, 420. Then, the controller 130, based on the feature points of each of the first and second images 430, 440 obtained from the first and second 2D images respectively corresponding to the first and second depth maps 410, 420, may compose the first and second images 430, 440 and generate a left-eye panoramic image 450.

Similarly, the area setting unit 120, as illustrated in FIG. 5, analyzes depth maps belonging to the second areas 413, 423 from among each area of the first and second depth map 410, 420, and divides areas having the similar depth values. That is, the area setting unit 120 may divide, on the second area 413, may divide area a' 413-1, area b' 413-2, and area c' 413-3 to areas having the similar depth value. Therefore, the area setting unit 120 may set the area a' 413-1, area b' 413-2, and area c' 413-3 having the similar depth values to a right-eye image area of the first depth map 410. In addition, the area setting unit 120 may divide, on the second area 423 of the second depth map 420, the area d' 423-1, area e' 423-2, and area f 423-3 to areas having the similar depth maps. Therefore, the area setting unit 120 may set area d' 423-1, area e' 423-2, and area f 423-3 having the similar depth values to a right-eye image area of the second depth map 410.

As such, when a right-eye image area is set on the second areas 413, 423 of each of the first and second depth maps 410, 420, the controller 130, from among the first and second 2D images respectively corresponding to the first and second depth maps 410, 420, obtains the first image 460 corresponding to a left-eye image area and the second image 470. Then, the controller 130, based on the feature points of the first and second images 460, 470 obtained from the first and second 2D images respectively corresponding to the first and second depth maps 410, 420, may compose the first and second images 460,470 and generate a left-eye panoramic image 480.

Until now, a method of generating a 3D panoramic image with respect to a plurality of 2D images based on a plurality of depth maps respectively corresponding to a plurality of 2D images by the image generation device 100 has been described in greater detail.

Hereinbelow, each configuration of the capturing device 10 including the image generation device 100 will be further described.

Figure 6:
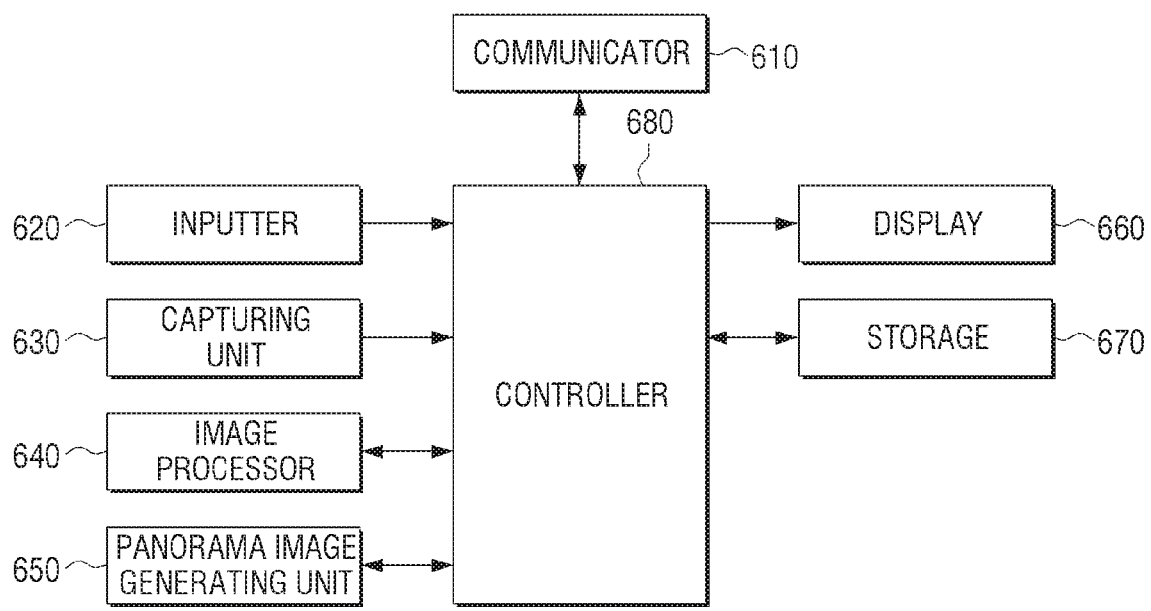
FIG. 6 is a block diagram of a capturing apparatus according to an exemplary embodiment.

FIG. 6 is a block diagram of a capturing apparatus according to an exemplary embodiment.

The capturing device 10 includes a communicator 610, inputter 620, a photographing unit 630, image processing unit 640, a panorama image generation unit 650, display unit 660, storage 670, and a controller 680.

The communicator 610 may communicate with an external device (not shown) by data communication and receive depth maps for each of a plurality of 2D images from the external device (not shown). In addition, the communicator 610 may communicate with electronic apparatuses such as a smart TV and tablet by wire or wirelessly and transmit a 3D panoramic image based on the plurality of 2D images. The communicator 610 may include wireless communication module and wired communication module. Here, the wired communication module may be a USB communication module providing interface with the external device (not shown), and wireless communication module may include at least one of near field communication module and distance communication module. The near field communication module may include at least one of WIFI DIRECT communication module, Bluetooth module, IrDA (infrared data association) module, NFC (Near Field Communication) module, and Zigbee module. In addition, the distant communication module may include cellular communication module, 3G mobile communication module, 4G mobile communication module, and 4G LTE (Long Term Evolution) communication module.

The inputter 620 is a configuration to receive a user command including at least one key button. In addition, the inputter 620 may be embodied as a touch screen on the display 650 and receive a touch command of a user. The inputter 620, through a key button or a touch screen, may receive a single capturing command or panorama capturing command, or receive a command to generate a 3D panoramic image with respect to the continuously captured 2D images according to a command of panorama capturing.

The capturing unit 630 may perform single capturing or panorama capturing according to a capturing command which is input through the inputter 620. The capturing unit 630 may include lens, shutter, iris, solid photographing element, AFE (Analog Front End), TG (Timing Generator), and an image sensor. The shutter adjust time when light reflected to a subject enters to an image sensor, the iris mechanically increases or decreases a size of an opening to adjust light amount entering the lens. The solid photographing element, when light reflected to the subject is accumulated as photo charge, outputs a phase by the photo charge as an electric signal. TG outputs a timing signal to lead out pixel data of the solid photographing element, and AFE samples and digitalizes an electric signal output from the solid photographing element. The capturing unit 630, when a command to photograph panorama is input through the inputter 620, may perform continuous capturing with respect to the subject located in a capturing direction of a user. As such, the configuration of the capturing unit 630 which photographs an image is a well-known art and will not be further described.

The image processor 640 makes raw image data of 2D images continuously captured through the capturing unit 630 as YCbCr data, determines an image black level, and adjusts sensitivity by colors. In addition, the image processor 640 may perform white balance, gamma adjustment, color interpolation, color correction, and resolution change with respect to the 2D images.

The panorama image generator 650, as the described image generation device 100, generates a 3D panoramic image based on a plurality of 2D images and depth maps respectively corresponding to a plurality of 2D images which are processed through the image processor 640. As described above, the panorama image generator 650, when a plurality of 2D images and depth map corresponding to 2D images are input, sets a left-eye image area and a right-eye image area with respect to each of a plurality of 2D images based on a plurality of depth maps.

According to an exemplary embodiment, the panorama image generator 650 may analyze depth values of each of a plurality of depth maps and, from among an area having the similar depth value and an 2D image area corresponding thereto, may set an area belonging to a first area as a left-eye image area and an image area belonging to a preset second area as a right-eye image area. According to still another exemplary embodiment, the panorama image generator 650 may set an image area by a plurality of 2D images, and an image area belonging to a first area as a left-eye image area and an image area belonging to a preset second area as a right-eye image area.

As such, within a plurality of 2D images, when a left-eye image area and a right-eye image area are set, the panorama image generator 650 composes images of each left-eye image area within a plurality of 2D images and generates a left-eye panorama image. Likewise, the panorama image generator 650 may compose an image of right-eye image area within a plurality of 2D images and generates a right-eye panorama image. To be specific, the panorama image generator 650 may extract the feature points from a plurality of 2D images and based on the feature points by images of a plurality of left-eye image area, compose an image of a plurality of left-eye image area and generate a left-eye panorama image. In the same manner, the panorama image generator 650, from among the feature points extracted from a plurality of 2D images, may compose an image with respect to a plurality of right-eye image areas based on the feature points by images of a plurality of right-eye image areas and generate a right-eye panorama image.

The display 660 displays a 3D panorama image generated from a captured 2D image or a plurality of 2D images. To do this, the display 120 may be embodied as a Liquid Crystal Display (LCD), Organic Light Emitting Display (OLED) or Plasma Display Panel (PDP), etc.

The storage 670 stores the 3D panorama image produced from the recorded 2D image or a plurality of 2D images. The same storage 670 can be embodied as a non-volatile memory (e.g., flash memory, EEROM (Electrically Erasable ROM)), a hard disk or the like.

The controller 680 controls operations of each configuration forming the capturing device 10. To be specific, the controller 680, a panorama capturing command with respect to a live view image displayed through the display 670 is input, may control to perform continuous capturing through the capturing unit 630, and control the image processor 640 to perform image processing with respect to 2D images continuously captured through the capturing unit 630. In addition, the controller 680 may control the panorama image generator 650 to transmit a plurality of 2D images processed through the image processor 640 and depth maps corresponding to a plurality of 2D images received through the communicator 610 to the panorama image generator 650 to generate a 3D panorama image.

So far, it has been described in detail for each configuration of the capturing apparatus 10 in accordance with the present invention. In the following, a method of generating a 3D panoramic image based on the plurality of 2D images from the image generation apparatus 100 according to the present invention will be described in detail.

Figure 7:
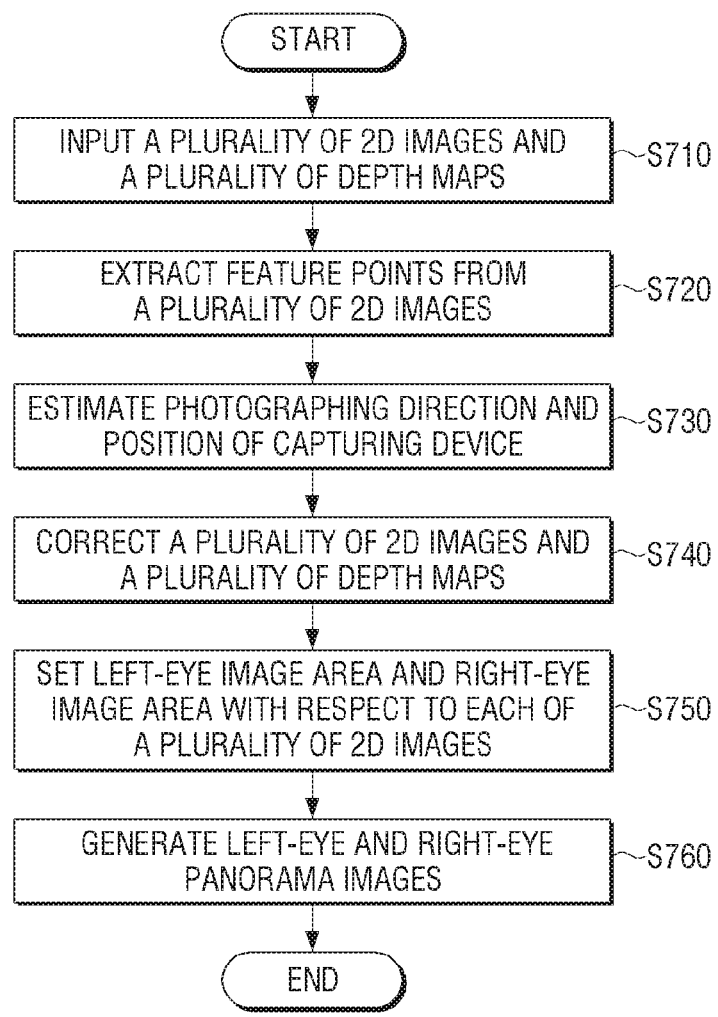
FIG. 7 is a flowchart of a method for generating a 3D panoramic image from image generation apparatus according to an exemplary embodiment.

FIG. 7 is a flowchart of a method for generating a 3D panoramic image from image generation apparatus according to an exemplary embodiment.

As illustrated in FIG. 7, the image generation device 100 receives a plurality of 2D images and a plurality of depth maps corresponding to 2D images (S710). Here, a plurality of 2D images are preferably overlapped with a part of 2D image. The plurality of 2D images are images captured through the capturing device 10, and a plurality of depth maps corresponding to a plurality of 2D images can be generated within the image generation device 100 or received from an external device (not shown). Here, an external device (not shown) generating a depth map corresponding to a plurality of 2D images can be a depth image capturing device. The depth image capturing device may generate depth map corresponding to a plurality of 2D images through at least one of pattern reflection method, stereo camera method, and time of flight method.

In the meantime, when a plurality of depth maps corresponding to a plurality of 2D images are not input, the image generation device 100, through the steps to be described, may generate depth maps corresponding to a plurality of 2D images through stereo matching between 2D images.

Through the various embodiments, when a plurality of 2D images and depth maps corresponding to a plurality of 2D are input, the image generation device 100 extracts the features points from each of a plurality of 2D images (S720). Then, the image generation device 100 estimates a direction and a position of the capturing device 10 which captures a plurality of 2D images (S730). According to an embodiment, the image generation device 100 may, based on at least one of change information of the feature points extracted from a plurality of 2D images and results estimated through a sensor, may estimate a direction and a position of the capturing device 10. Here, the sensor is an inertial measurement unit (IMU) which provides acceleration, speed, direction, distance of the capturing device 10 by measuring inertia of movement, and can be one of an accelerometer, gyroscope and a geomagnetic sensor.

Through the above embodiment, when a capturing direction and position of the capturing device 10 are estimated, the image generation device 100, in consideration of estimation result, corrects a plurality of 2D images and depth maps to a reference image and a reference depth map obtainable when photographed by the capturing device 10 in a reference direction and a reference position (S740).

Thereafter, the image generation device 100, based on a plurality of depth maps, sets a left-eye area and a right-eye image area with respect to a plurality of 2D images (S750). According to an exemplary embodiment, the image generation device 100 may analyze depth values of areas of a plurality of depth maps and set an image area belonging to a preset first area to a left-eye image area, and an image area belonging to a preset second area to a right-eye image area. According to still another embodiment, the image generation device 100, by using color segmentation algorithm, may set image areas by a plurality of 2D images, set an image area belonging to a preset first area to a left-eye area and an image area belonging to a preset second area to a right-eye image area.

Through the various exemplary embodiments, when a left-eye image area and a right-eye image area are set, the image generation device 100 generates a left-eye panorama image by composing an image of a left-eye image area within a plurality of 2D images, and generates a right-eye panorama image by composing an image of a right-eye image area within a plurality of 2D images (S760).

To be specific, the image generation device 100, based on feature points by images of a plurality of left-eye image area, may generate a left-eye panorama image, and a right-eye panorama image with respect to right-eye image areas based on the feature points of a plurality of right-eye image areas. According to embodiments, the image generation device 100, by using image mosaicking algorithm, may compose images of a plurality of left-eye image area to generate a left-eye panorama image and a right-eye panorama image by composing a plurality of right-eye image areas.

So far, the present invention has been described with respect to the preferred embodiments.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

DRAWINGS

[FIG. 1]
110 IMAGE INPUTTER
130 CONTROLLER
120 AREA SETTING UNIT
[FIG. 2]
110 IMAGE INPUTTER
120 AREA SETTING UNIT
130 CONTROLLER
140 POSITION ESTIMATION UNIT
150 IMAGE CONVERSION UNIT
[FIG. 6]
610 COMMUNICATOR
620 INPUTTER
630 CAPTURING UNIT
640 IMAGE PROCESSOR
650 PANORAMA IMAGE GENERATING UNIT
660 DISPLAY
680 CONTROLLER
670 STORAGE
[FIG. 7]
START
S710 INPUT A PLURALITY OF 2D IMAGES AND A PLURALITY OF DEPTH MAPS
S720 EXTRACT FEATURE POINTS FROM A PLURALITY OF 2D IMAGES
S730 ESTIMATE PHOTOGRAPHING DIRECTION AND POSITION OF CAPTURING DEVICE
S740 CORRECT A PLURALITY OF 2D IMAGES AND A PLURALITY OF DEPTH MAPS
S750 SET LEFT-EYE IMAGE AREA AND RIGHT-EYE IMAGE AREA WITH RESPECT TO EACH OF A PLURALITY OF 2D IMAGES
S760 GENERATE LEFT-EYE AND RIGHT-EYE PANORAMA IMAGES
END

What is claimed is:

1. A method for generating a 3D panoramic image by an image generating apparatus, the method comprising:
   receiving a plurality of 2D images and a plurality of depth maps, each depth map corresponding to a respective one of the plurality of 2D images;
   setting a left-eye image area and a right-eye image area for each of the plurality of 2D images based on the plurality of depth maps; and
   generating a left-eye panoramic image by composing the left-eye image areas set for each of the plurality of 2D images, and generating a right-eye panoramic image by composing the right-eye image areas set for each of the plurality of 2D images,
   wherein the setting comprises analyzing depth values of each of the plurality of depth maps and setting, from among 2D image areas in a respective 2D image corresponding to areas having similar depth values, an image area belonging to a first area as a left-eye image area for the respective 2D image and an image area belonging to a second area as a right-eye image area for the respective 2D image.

2. The method of claim 1, wherein at least one 2D image from among the plurality of 2D images overlaps with a portion of another different 2D image from among the plurality of 2D images.

3. The method of claim 1, wherein the setting comprises determining image areas for the plurality of 2D images using a segmentation algorithm and setting, from among the determined image areas, an image area of a respective 2D image belonging to a first area as a left-eye image area for the respective 2D image and an image area of the respective 2D image belonging to a second area as a right-eye image area of the respective 2D image.

4. The method of claim 1, further comprising:
extracting feature points from the plurality of 2D images,
wherein the generating comprises generating a left-eye panoramic image by composing the left-eye image areas based on the feature points, and generating a right-eye panoramic image by composing the right-eye image areas based on the feature points.

5. The method of claim 4, further comprising:
estimating a capturing direction and position of a capturing device that captured the plurality of 2D images; and
based on the estimating, correcting the plurality of 2D images and the plurality of depth maps,
wherein the setting comprises setting a left-eye image area and a right-eye image area for each of the plurality of corrected 2D images based on the corrected depth maps.

6. The method of claim 5, wherein the estimating comprises estimating the capturing direction and position of the capturing device based on at least one of feature point change information extracted from the plurality of 2D images or inertial sensor data from an inertial sensor.

7. The method of claim 6, wherein the plurality of depth maps comprise depth maps generated based on stereo matching of the plurality of 2D images according to the capturing direction and the position of the capturing device estimated based on the inertial sensor data.

8. The method of claim 1, wherein the left-eye image areas and the right-eye image areas are composed by mosaicking.

9. An image generating device, comprising a processor configured to control:
receiving a plurality of 2D images and a plurality of depth maps, each depth map corresponding to a respective one of the plurality of 2D images;
setting a left-eye image area and a right-eye image area for each of the plurality of 2D images based on the plurality of depth maps; and
generating a left-eye panoramic image by composing the left-eye image areas set for each of the plurality of 2D images, and generating a right-eye panoramic image by composing the right-eye image areas set for each of the plurality of 2D images,
wherein the setting comprises analyzing depth values of each of the plurality of depth maps and setting, from among 2D image areas in a respective 2D image corresponding to areas having similar depth values, an image area belonging to a first area as a left-eye image area for the respective 2D image and an image area belonging to a second area as a right-eye image area for the respective 2D image.

10. The device of claim 9, wherein at least one 2D image from among the plurality of 2D images overlaps with a portion of another different 2D image from among the plurality of 2D images.

11. The device of claim 9, wherein the processor is configured to control determining image areas for the plurality of 2D images using a segmentation algorithm and setting, from among the determined image areas, an image area of a respective 2D image belonging to a first area as a left-eye image area for the respective 2D image and an image area of the respective 2D image belonging to a second area as a right-eye image area of the respective 2D image.

12. The device of claim 9, wherein the processor is configured to control extracting feature points from the plurality of 2D images, generating a left-eye panoramic image by composing the left-eye image areas based on the feature points, and generating a right-eye panoramic image by composing the right-eye image areas based on the feature points.

13. The device of claim 12, further comprising:
an inertial sensor unit for inertial sensor data corresponding to a capturing direction and position of a capturing device that captured the plurality of 2D images,
wherein the processor is configured to control, based on the inertial sensor data, correcting the plurality of 2D images and the plurality of depth maps and setting a left-eye image area and a right-eye image area for each of the plurality of corrected 2D images based on the corrected depth maps.

\* \* \* \* \*